United States Patent [19]

De Marco et al.

[11] Patent Number: 5,031,573
[45] Date of Patent: Jul. 16, 1991

[54] TRANSPORTATION CONTAINER FOR LABORATORY ANIMALS

[76] Inventors: Peter F. De Marco; Cynthia D. De Marco, both of 1297 Palmer House Ct., Columbus, Ohio 43235

[21] Appl. No.: 482,906

[22] Filed: Feb. 22, 1990

[51] Int. Cl.⁵ .............................................. A01K 1/03
[52] U.S. Cl. ..................................... 119/15; 206/429
[58] Field of Search ................. 119/15, 19; 206/315.9, 206/429, 443, 446, 407, 423, 445

[56] References Cited

U.S. PATENT DOCUMENTS

| | | | |
|---|---|---|---|
| 903,918 | 11/1908 | Thrower | 119/19 X |
| 2,844,363 | 7/1958 | Clark | 206/446 X |
| 2,962,187 | 11/1960 | Morris | 206/407 X |
| 2,983,371 | 5/1961 | Richards | 206/429 |
| 3,874,335 | 4/1975 | Galasso | 119/15 X |
| 3,899,100 | 8/1975 | Rigaud | 206/407 X |
| 4,212,267 | 7/1980 | Patterson | 119/15 X |
| 4,785,764 | 11/1988 | Müller | 119/15 |
| 4,890,731 | 1/1990 | Mroz | 206/315.9 |

*Primary Examiner*—Robert P. Swiatek
*Attorney, Agent, or Firm*—Frank H. Foster

[57] ABSTRACT

A container made up of a smooth, seamless, synthetic resin cylinder with air permeable end caps which screw on at each end used for transporting animals. A holder made of corrugated paper with aligned holes on opposite panels through which the containers are inserted and held.

7 Claims, 4 Drawing Sheets

TRANSPORTATION CONTAINER FOR LABORATORY ANIMALS

TECHNICAL FIELD

This invention relates to the field of animal transport containers and apparatus for holding the same containers.

BACKGROUND ART

Animal transport containers are used to transport live animals from one location to another. During this transit the animal should maintain its health and fitness. For this to occur the container must meet a number of criteria.

The animals require such items as bedding, food, water and air to survive. The people responsible for transportation prefer that the container be inexpensive to manufacture or purchase, easily cleaned if reuseable, and safe for those people loading and unloading the animals.

The economics of the container are determined by the initial cost and the number of reuses of the container. To be reused the container must be effectively made sanitary.

The container must additionally hinder the escape of the animal by preventing gnawing or clawing on the mechanisms of the container or the container itself.

U.S. Pat. No. 922,993 shows some of the characteristics described above. This patent discloses a very large, cylindrical, steel tube for transporting human convicts. It has an axle which passes through the tube with attached wheels on either side of the tube. At the rear it has an exit door and at the front it has an air inlet, an awning and a hitch. The container, though not described for animals, demonstrates some inherent problems. The presence of a through axle provides a possible point of engagement for escape by the convicts or animals. The front of the container does not allow entry or exit which limits usefulness and cleaning access. Furthermore, the location of the locking device on the door allows the contained convicts or animals direct access at the locking mechanism. The complexity and therefore the expense of manufacture of the convict cage is increased by the addition of an attached mobility system, consisting of wheels and a hitch. Cleaning of the container is also very restricted because of the presence of beds and an internal door.

U.S. Pat. No. 2,522,391 discloses a carrier for small animals. This device shows a door located on the side which allows access by the contained animal to the door. It provides a point at which the animal can gnaw or insert its claws. The complexity of the system is further increased by the addition of a handle, small bumpers and latches. These add to the difficulty with which the container is cleaned and further increase the initial expense of the container.

U.S. Pat. No. 3,272,376 shows an insect container. The container disclosed uses a fine, flexible mesh wire tube embedded in a hardening plaster material at one end with a removable cap at the other. This system, though described for insects, would provide many disadvantages if used to contain animals. Primarily, the animal could easily escape since the lid contains no securing device, other than a frictional engagement of the lid with the wire mesh. Additionally, the plaster-like material on the bottom of the container would greatly inhibit sanitization of the container since it is porous and, as such, would absorb most liquids. The weight of the plaster material at the one end is additionally a non-necessity for animal transport and a hinderance for economical transport.

Most conventional animal containers are one of the following three types. Screen cardboard boxes with perforations at various locations, plastic or wood boxes with handles and screened ventilation ports at various locations, or wire mesh cages with a door on one or more sides.

The cardboard container, while cardboard is inexpensive, is very unsanitary since it absorbs liquids and is not reuseable. Additionally, it is not very strong for transporting large animals. The plastic or wood container is expensive to manufacture and difficult to effectively clean. The wire mesh container is somewhat expensive to manufacture and rusts after a number of uses. All three types are very dangerous for the person responsible for removing the animal from it. The danger arises when the handling person is forced to reach into the container to get the animal. The animal can grab hold of the wire mesh or some other engagable surface and not let go, or when the person has his hand inside the container, the animal can bite him.

The need arises, therefore, for an economical animal container which is inexpensive to manufacture, is easily and effectively cleaned, can be sealed such that animal escape is virtually impossible, and which provides ease and safety in removal of the animal.

BRIEF DISCLOSURE OF INVENTION

This invention is an animal transport container. The container comprises a smooth, seamless, fluid impervious, cylindrical tube. The container further comprises a removably fastened, air permeable end cap at each end of the tube. The container provides safe and economical transport of animals. Combined with the container is a holder which comprises at least two opposed panels. Into these panels is formed at least one aligned hole pair into which the container may be inserted and frictionally engaged by the panels.

Figure 1:
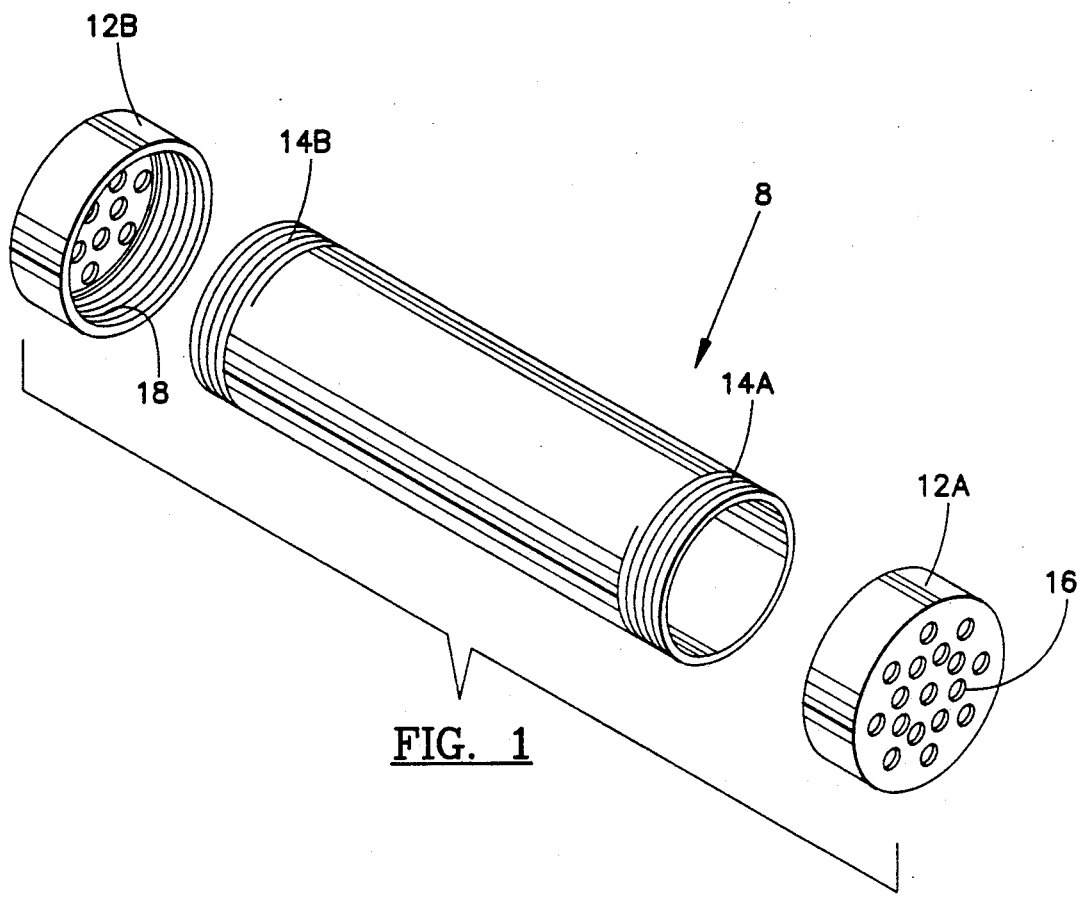
FIG. 1 is an exploded view in perspective showing a cylindrical tube and end caps.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

FIG. 1 illustrates the preferred embodiment of the container 8 which has a cylindrical tube 10 onto which two end caps 12A and 12B are attached. The cylindrical tube 10 has threads 14A and 14B formed in each end which facilitate attachment of the end caps 12A and 12B. The cylindrical tube 10 is ideally constructed of a synthetic resin tubing, such as polypropylene or polyethylene which are inexpensive to manufacture or purchase and which inherently have all the characteristics required. The cylindrical tube 10 should have high-temperature cleaning characteristics, which allow for technically advanced and conventional sanitation methods and which facilitate use of conventionally used disinfectants for cleaning. It is also smooth and seamless to prevent the contained animal from gnawing or clawing at its surface and to allow ease in removal of the animal. The cylindrical tube 10 is fluid impervious to prevent the lodging of particles in, or passing of fluid through, the cylinder walls. Ideally, the cylindrical tube 10 should be translucent so that viewing of the animal's location is possible. This translucency facilitates viewing of the animal during loading and unloading while not upsetting the animal with sudden changes in direct light anytime during the transit. The cylindrical tube 10 may be cleaned and reused hundreds of times, which enhances its economic attractiveness.

The end caps 12A and 12B, in the preferred embodiment, are made of the same material as the cylindrical tube 10 and comprise a cylindrically shaped ring having much smaller length than the cylindrical tube 10. This cylindrical ring has one of its two ends formed with a wall extending across the ring of the same material as used for the cylindrical ring. This end wall has small holes 16 formed into it to allow ventilation through the cylindrical tube 10 after assembly.

The end caps 12A and 12B attach to the cylindrical tube 10 by threads 14A and 14B formed on the interior of the end caps 12A and 12B and mating threads on the exterior of the cylindrical tube 10 such that conventional screwing attachment is facilitated.

Figure 10:
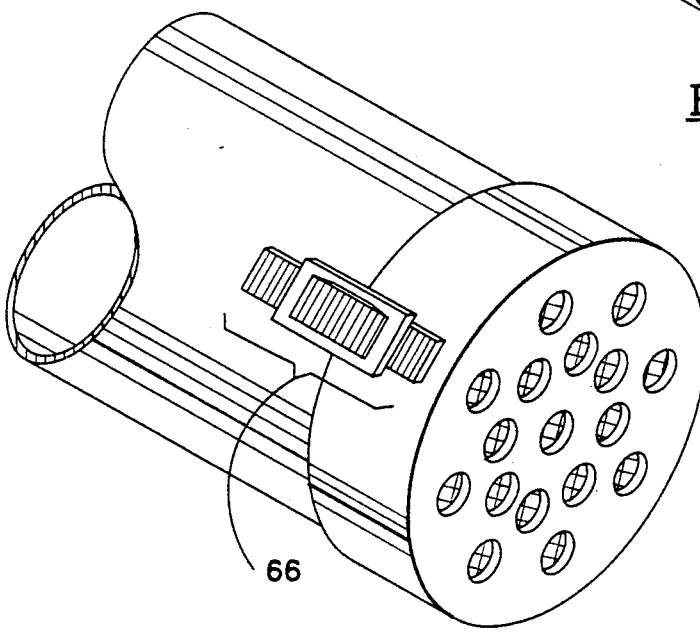
FIG. 10 is a view in perspective showing an alternative embodiment of a means for fastening an end cap to a cylindrical tube.

Other structures for attaching the end cap to the cylindrical tube 10 are possible such as a buckle 66 as shown in FIG. 10, or tape, or slots and bayonets, or some other type of conventional fastening structure formed onto the cylindrical tube 10 and the end caps 12A and 12B.

FIG. 1 shows end cap 12B from the opposite side as end cap 12A. This view shows the threads 18 on the interior of the end cap 12B which correspond to and may be engaged with the threads 14B on the cylinder tube 10. End cap 12A has similar threads formed on its interior which correspond to and may be engaged with threads 14A.

Figure 2:
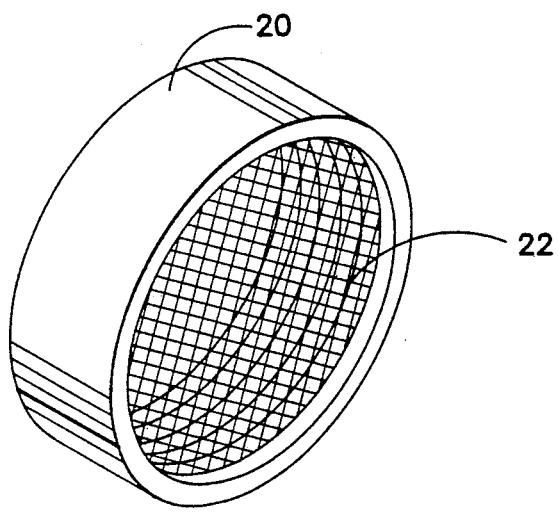
FIG. 2 is a view in perspective of an alternative end cap embodiment.

FIG. 2 shows another possible embodiment of an end cap 20 disclosing lattice 22 formed on the closed end spanning across the interior of the cylindrical ring. This lattice 22 permits ventilation through the container 8 similarly to the holes 16 in FIG. 1.

Figure 3:
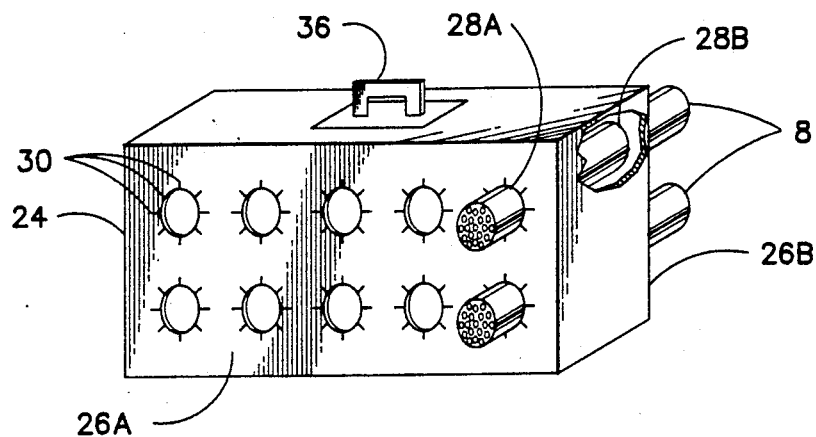
FIG. 3 is a view in perspective showing the preferred embodiment of a holder.

A transport container holder 24, illustrated in FIG. 3 as the preferred embodiment, is constructed from corrugated paperboard having two opposed panels 26A and 26B. These opposed panels have holes 28A and 28B formed through them. These holes 28A and 28B permit the insertion of the container 8 and allow it to be held in frictional engagement with the opposed panels. In the preferred embodiment, there are additionally a series of cuts 30 formed around the circumference of the holes 28A and 28B extending radially outward of the holes 28A and 28B. These cuts 30 are approximately one-half to three-quarters of an inch in length and are located at approximately the 12, 3, 6, and 9 o'clock positions. There are at least 4 additional cuts 30 of equal length as the initial cuts 30 made equidistant from and between the initial cuts 30. These cuts 30 enable the container 8 to be inserted into the holes 28A and 28B when the diameter of the holes 28A and 28B is smaller than the diameter of the container 8. Because the containers protrude from the holder, the end caps have access to ambient air to facilitate ventilation of the interior of the containers.

The holder 24 is preferably constructed of corrugated paperboard of the type having 200–250 pound test. The dimensions of the preferred embodiment of the holder 24 are approximately 31 inches in length, 18 inches in width and 22 inches in height. These dimensions vary, however, to suit the containers used and different transport methods. Approximately 2 inches of space is left between each hole and between the holes and the edge of the holder 24. This enhances the strength of the holder 24 as well as facilitating the placement of customized water packs between the containers when necessary. If some of these holes are unused or additional openings are formed in the holder, this spacing allows thorough air circulation around the portions of the containers in the holder to further reduce heat loads.

Figure 4:
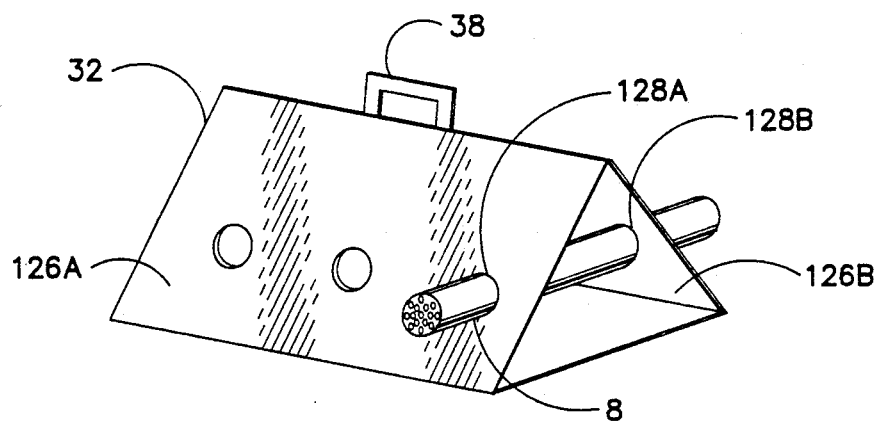
FIG. 4 is a view in perspective of an alternative holder embodiment.

FIG. 4 shows another possible embodiment of the holder 32 having a triangular shape simplifying construction and providing structural rigidity. The holes 128A and 128B are aligned on the opposed panels as those in FIG. 3 and similarly facilitate insertion and frictional engagement of the container 8. These holes 128A and 128B may also have cuts made around their circumference as in the preferred embodiment.

FIGS. 3 and 4 show hand grippable handles 36 and 38 formed on the top surface of the holders 24 and 32 respectively. These handles 36 and 38 facilitate the insertion of and gripping by the handler's hand and therefore improve the carrying characteristics of the holders 24 and 32.

Figure 5:
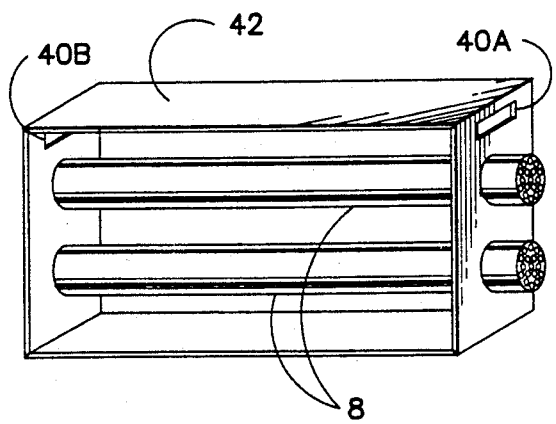
FIG. 5 is a view in perspective of an alternative holder embodiment.

The handles 40A and 40B in FIG. 5 serve the same purpose as the hand grippable surfaces in FIGS. 3 and 4 and are similar hand grippable shapes. These handles, 40A and 40B, however, are cut in the end of the holder 42 instead of the top as in FIGS. 3 and 4. This may be done wherever structural rigidity allows.

Figure 6:
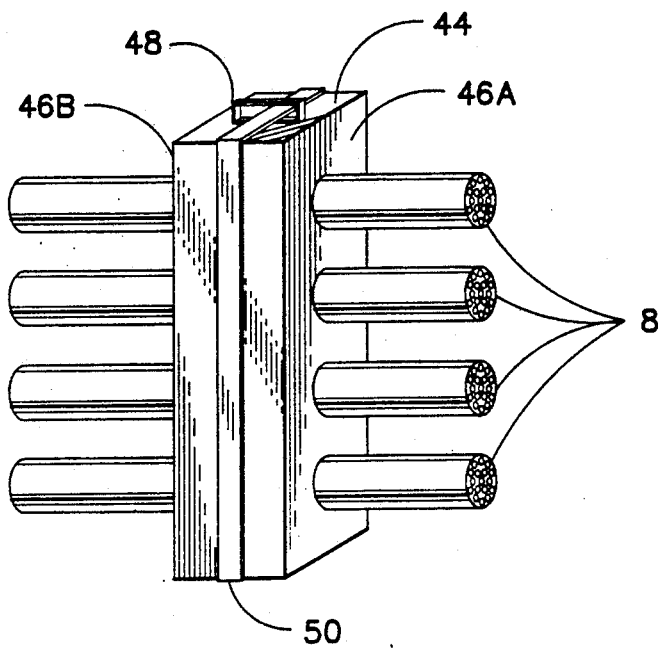
FIG. 6 is a view in perspective of an alternative holder embodiment.

FIG. 6 shows a holder 44 having much smaller length than the containers. The panels 46A and 46B are much closer to each other than in previous embodiments, exposing more of the external surface of the container 8 so that air circulation around the container 8 is enhanced This air circulation around the container 8 tends to keep the temperature within the container 8 equal to the environmental temperature.

The hand grippable surface 48 formed on the holder 44 in FIG. 6 comprises a strap 50 attached around the holder 44 onto which a rectangular handle 48 is attached. The rectangular handle 48 permits the insertion of the handler's hand for lifting and carrying the holder 44.

Figure 7:
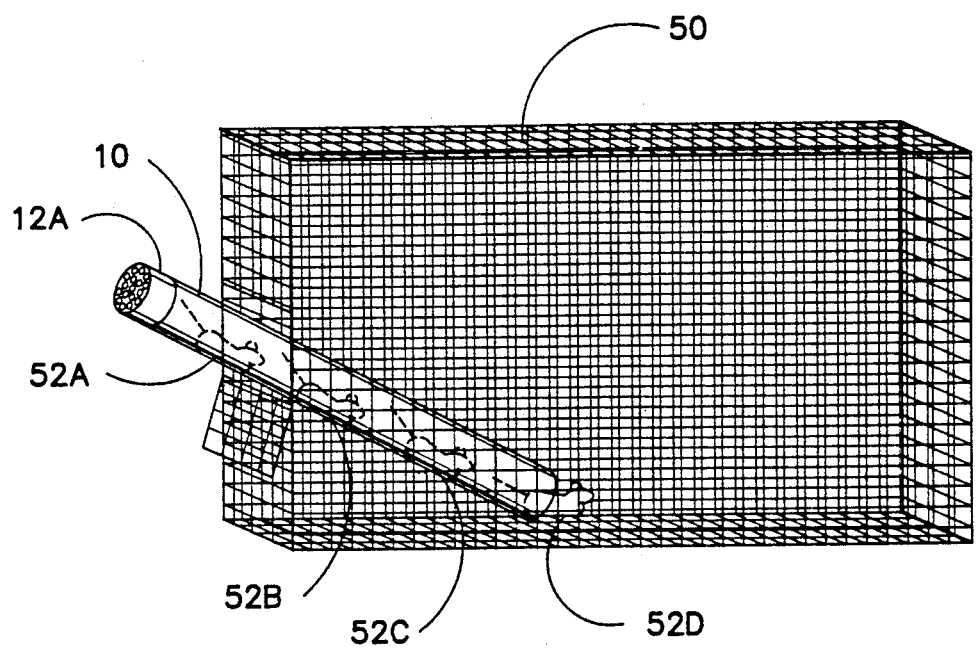
FIG. 7 is a view in perspective showing use of a container in removing animals.

The operation of the container 8 is as follows. Referring to FIGS. 1, 3, and 7, one end cap 12A or 12B is screwed onto the end of the cylindrical tube 10 and an animal and other contents are placed into the cylindrical tube 10. The other end cap is then screwed onto the end of the cylindrical tube 10.

The end cap 12B is placed into contact with the cylindrical tube 10 and twisted such that the threads 18 on the end cap 12B matingly engage with the threads 14B on the cylindrical tube 10. This twisting of the end cap 12B is continued until the end cap 12B is completely seated against the cylindrical tube 10. An identical process occurs for end cap 12A. In the preferred embodiment, after the end caps 12A and 12B are screwed onto the cylindrical tube 10, they are further fastened with wide tape over the cylindrical tube 10 and the end caps 12A and 12B to insure the impossibility of escape by the contained animal. The container 8 is then inserted into the holder 24 either along with other containers or by itself. As the container 8 is inserted into the holes 28A and 28B, the cuts 30 allow the diameter of the holes 28A and 28B in the panels 26A and 26B to increase to the diameter of the container 8 and apply a force against the external surface of the cylindrical tube 10. This force maintains the position of the container 8 in the holes 28A and 28B by friction so that rollover and shifting of the container 8 are eliminated. In the preferred embodiment, the container 8 extends approximately six inches outward of each panel 26A and 26B such that proper ventilation around the exterior of the container 8 is possible. This air circulation around the container 8 maintains the temperature of the air within the container 8 to be approximately that of the environment.

The holder 24 is then shipped to the buyer who unscrews end cap 12A or 12B. The buyer then, as shown in FIG. 7, gently tilts the cylindrical tube 10 into the cage 50, such that the animals 52A, 52B, 52C, and 52D gently slide down the smooth interior of the cylindrical tube 10, into the cage 50. No handling of the animals is necessary when animals are packaged in a quantity desired for each cage. The translucency of the cylindrical tube 10 permits viewing of the location of the contained animals 52A 52B, and 52C so that during removal, the animals are sure to all be removed. The end cap 12A and 12B is then screwed onto the cylindrical tube 10, the container 8 is inserted into the holder 24 and the entire assembly is shipped back to the supplier. If the holders are otherwise constructed like a conventional paperboard container, the tubes and end caps can be inserted in the interior and returned to the vendor.

Because the end walls of the end caps 12A and 12B of the container 8 meet at 90° angles with the cylindrical tube 10, there are no locations where the contained animal may gnaw or insert its claws to wear away at the container 8 and possibly escape. Because of the tight fitting threads which are used to attach the end cap 12A and 12B to the cylindrical tube 10, there are no small crevices through which smaller animals may escape. Additionally, the bedding within the container 8 and any animal waste cannot escape the system of the container 8.

Figure 8:
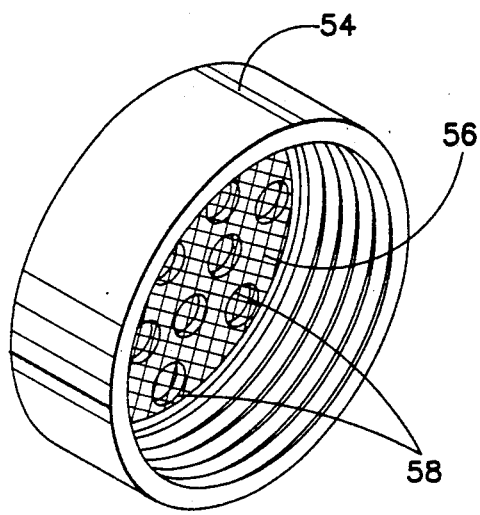
FIG. 8 is a view in perspective showing the inside of an end cap.

An alternative embodiment of an end cap 54, illustrated in FIG. 8, shows the placement of mesh screen 56 within the end cap 54 to prevent gnawing by small animals on the drilled holes 58. If needed, stainless steel or aluminum mesh may be used to prevent gnawing by rodents or other species. The mesh 56 is preferably glued to the closed end of the end cap 54 on the interior of the end cap 54, such that all mesh 56 is perpendicular to the cylindrical tube 10 after assembly. This inhibits gnawing or clawing by the contained animal.

Figure 9:
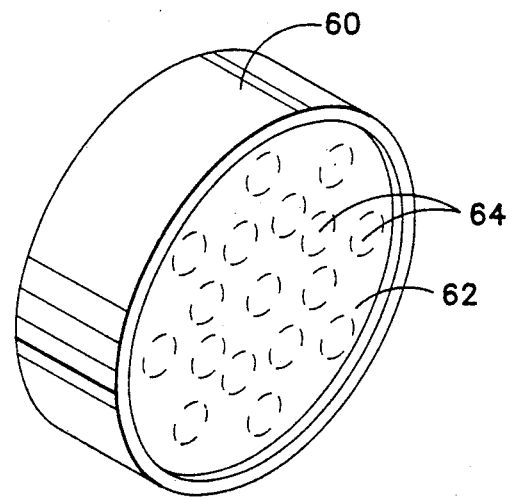
FIG. 9 is a view in perspective showing attached filter paper on an end cap.

Another alternative embodiment of an end cap 60 comprises the attachment of filter paper 62 around the exterior of the end cap 60 as shown in FIG. 9. This is done so that air which circulates through the container 8 from the outside will be filtered. This is especially desirable for Specific Pathogen Free (SPF) animals. The filter paper 62 is ideally cut in a circular disk shape and glued on the outside of the end cap 60 over the holes 64 formed in the closed end of the end cap 60 or over the lattice 22 in the other embodiment of the end cap 20 illustrated in FIG. 2. This attachment of filter paper 62 allows an easy change of the porosity of the filter paper 62 by merely removing it and inserting another piece of filter paper of desired porosity. Alternatively, the filter paper can be held in an annular groove formed on the interior of the end cap outwardly of the perforated wall of the cap and/or can be held by retainer bars extending radially across the end cap.

The container 8 has removable end caps 12A and 12B in FIG. 1 at both ends which enhances the effectiveness and sanitation of the cylindrical tube 10. During cleaning, the cylindrical tube 10 may be inserted into any type of machine or bath which will effectively disinfect it. Because the cylindrical tube 10 is non-porous and has no cracks or crevices, there are no places for bacteria or unwanted material to become lodged.

As shown in FIG. 7, the removal of the animals 52A, 52B, 52C, and 52D is greatly simplified with increased safety for the handler. The handler, instead of reaching into a dark container to be possibly bitten or scratched, merely removes either end cap 12A or 12B, tilts the cylindrical tube 10 and gently coaxes the animals out by gravity. Then, the cylindrical tube 10 is removed from the cage 50 and the door is closed. This prevents injuries to the handler by having to reach into a container and physically touch the animals, and reduces stress on the animals from constant handling and disruption.

In addition to increasing the safety of the handler, the time which is required to remove the animals and the liability of the employer are greatly decreased.

While certain preferred embodiments of the present invention have been disclosed in detail, it is to be understood that various modifications may be adopted without departing from the spirit of the invention or scope of the following claims.

What is claimed is:
1. An animal transport apparatus comprising:
   (a) an animal transport container comprising a smooth, seamless, fluid impervious tube and a pair of removably fastened air permeable end caps which have no material which is both accessible to and destructible by an animal and are located at each end of the tube for the safe and economical transport of animals; and
   (b) a holder comprising at least two opposed panels in which at least one aligned hole pair is formed, one hole in each panel smaller than the tube, each hole of each aligned hole pair having substantially the same dimensions as the other hole of the pair, for the insertion and frictional engagement of the animal transport container.
2. The holder according to claim 1 wherein a hand grippable surface is formed on the holder for ease in handling the holder.

3. An animal transport apparatus in accordance with claim 1 wherein a series of radial cuts are formed around the circumference of the holes.

4. An animal transport apparatus comprising:
(a) an animal transport container comprising a smooth, seamless, fluid impervious, cylindrical tube and a removably fastened air permeable end cap which is indestructible by the contained animal at each end of the tube for the safe and economical transport of animals; and
(b) a holder comprising at least two opposed panels in which at least one aligned hole pair is formed, one hole in each panel, for the insertion and frictional engagement of the animal transport container and a hand grippable surface formed on the holder for ease in handling the holder and wherein a plurality of aligned hole pairs are formed in the panels each hole pair spaced relative to other hole pairs such that air circulation within the holder between containers inserted in the hole pairs is possible for maintaining ambient temperatures within the containers.

5. The holder according to claim 4 wherein at least one hole is formed in the panels to provide ventilation of the interior of the holder.

6. An animal transport apparatus comprising:
(a) an animal transport container comprising a smooth, seamless, fluid impervious, cylindrical tube and a removably fastened air permeable end cap which is indestructible by the contained animal at each end of the tube for the safe and economical transport of animals; and
(b) a holder comprising at least two opposed panels in which at least one aligned hole pair is formed, one hole in each panel, for the insertion and frictional engagement of the animal transport container and a hand grippable surface formed on the holder for ease in handling the holder and wherein a container inserted in the holder extends beyond the panels on either side such that air circulation is possible around the container for maintaining ambient temperature within the container.

7. An animal transport container comprising:
(a) a smooth, seamless, fluid impervious, cylindrical tube constructed from lightweight, temperature resistant, translucent, synthetic resin for economical manufacture and transport, increased effectiveness of sanitation, and ease and safety in removal of the animal; and
(b) a pair of removably fastened air permeable end caps having no material which is both accessible to and destructible by an animal and located at each end of the tube for the safe and economical transport of animals, the end caps including a mesh screen lattice which is indestructible by the contained animal extending across the interior of circular rings for allowing ventilation through the container, the end caps also including a filtration material of selected pore size securely covering the end caps such that the air is filtered, the end caps being fastened to the cylindrical body by screw threads formed on the interior of the end caps which matingly engage with corresponding screw threads on the exterior of the cylindrical body such that fastening is accomplished by twisting the end caps onto the cylindrical body.

* * * * *